(12) United States Patent
Brooks

(10) Patent No.: US 10,724,672 B2
(45) Date of Patent: Jul. 28, 2020

(54) AUGER SUPPORT STAND

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

(21) Appl. No.: 16/239,624

(22) Filed: Jan. 4, 2019

(65) Prior Publication Data

US 2019/0301662 A1    Oct. 3, 2019

Related U.S. Application Data

(63) Continuation-in-part of application No. 15/376,482, filed on Dec. 12, 2016, now Pat. No. 10,440,946, which is a continuation-in-part of application No. 15/330,409, filed on Sep. 16, 2016, now Pat. No. 10,159,243, which is a continuation-in-part of application No. 14/999,091, filed on Mar. 29, 2016, now Pat. No. 9,743,659.

(51) Int. Cl.
| | |
|---|---|
| *A01K 1/04* | (2006.01) |
| *F16M 11/04* | (2006.01) |
| *A01M 31/06* | (2006.01) |
| *A01K 31/14* | (2006.01) |
| *A01K 39/01* | (2006.01) |
| *F16B 2/18* | (2006.01) |

(52) U.S. Cl.
CPC ......... *F16M 11/041* (2013.01); *A01K 31/14* (2013.01); *A01K 39/01* (2013.01); *A01M 31/06* (2013.01); *F16B 2/18* (2013.01)

(58) Field of Classification Search
CPC ...... A45F 3/44; A01M 31/06; E04H 12/2223; E04H 15/62
See application file for complete search history.

(56) References Cited

U.S. PATENT DOCUMENTS

| | | |
|---|---|---|
| 32,226 A | 4/1861 | Dotson |
| 168,890 A | 10/1875 | Field |
| 345,877 A | 7/1886 | Brainard |
| 907,799 A | 12/1908 | Hawley |
| 1,562,343 A | 11/1925 | Post |
| 2,269,996 A | 1/1942 | Milton et al. |
| 2,447,444 A | 8/1948 | Waite |

(Continued)

*Primary Examiner* — Amy J. Sterling
(74) *Attorney, Agent, or Firm* — Carrithers Law Office, PLLC; David W. Carrithers

(57) ABSTRACT

A rotary auger support stand for holding objects such as decoys above the ground. The auger support stand includes at least one rod of longitudinal support member or shaft. The rotary auger anchor comprises a helical coil for screwing that end of the stake into the ground. handle means such as an S-shaped handle provides a crank handle for rotatably screwing the anchor into the ground or at least two opposing legs extend perpendicular from and between the shaft and auger forming a base. The distal end of opposing legs are bent upward perpendicular from the ground or bent upward and inwardly at an acute angle toward the shaft forming handles for rotating the auger into the ground. The transverse legs extending from the elongated support pole provides a base bearing against the ground for increased lateral support. The top distal end of the shaft includes means for supporting an object.

20 Claims, 14 Drawing Sheets

(56) References Cited

U.S. PATENT DOCUMENTS

| | | | |
|---|---|---|---|
| 2,563,159 | A | 8/1951 | Louis |
| 2,901,789 | A | 9/1959 | Frank |
| 3,059,732 | A | 10/1962 | Hammack |
| 3,286,962 | A | 11/1966 | Warth |
| 3,318,560 | A | 5/1967 | Garrette, Jr. et al. |
| 3,688,454 | A | 9/1972 | Wolfcarius |
| 4,928,418 | A | 5/1990 | Stelly |
| 5,098,057 | A | 3/1992 | Gran |
| 6,116,760 | A | 9/2000 | Cox |
| 6,412,236 | B1 | 7/2002 | Johnson |
| 6,481,147 | B2 | 11/2002 | Lindaman |
| 6,487,977 | B1 | 12/2002 | Willaims |
| 6,698,132 | B1 | 3/2004 | Brint |
| 6,810,630 | B2 | 11/2004 | Chizmas |
| 6,901,693 | B1 | 6/2005 | Crowe |
| D550,071 | S | 9/2007 | Powell |
| D554,980 | S | 11/2007 | Mihelis |
| 7,493,873 | B2 | 2/2009 | Petersen |
| 8,136,471 | B1 * | 3/2012 | Carrette .................. G09F 17/00 116/173 |
| 8,230,638 | B1 | 7/2012 | Dunaway |
| 9,945,144 | B2 * | 4/2018 | Brooks ................. A01M 31/06 |
| 2005/0268522 | A1 | 12/2005 | Foster |
| 2014/0332645 | A1 | 11/2014 | Brooks |

* cited by examiner

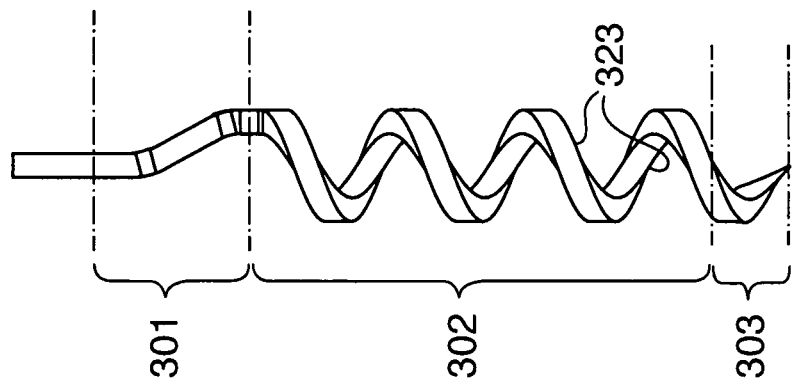
FIG. 20
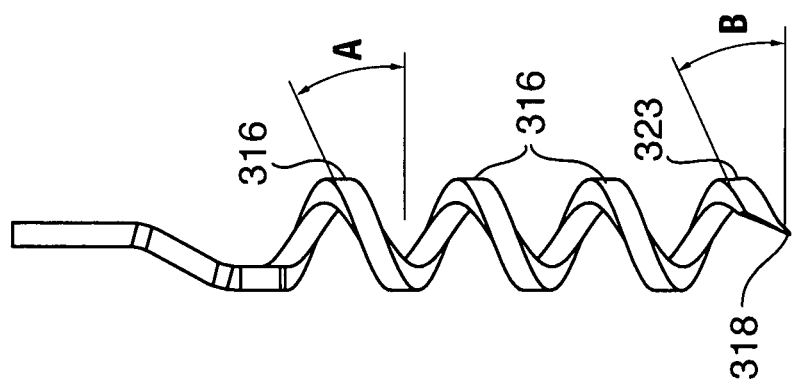
FIG. 19
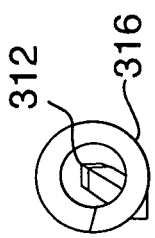
FIG. 18
FIG. 17
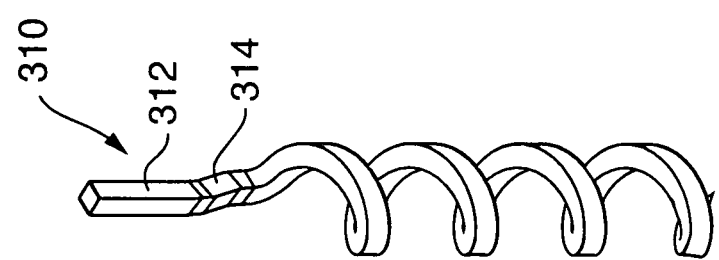
FIG. 16

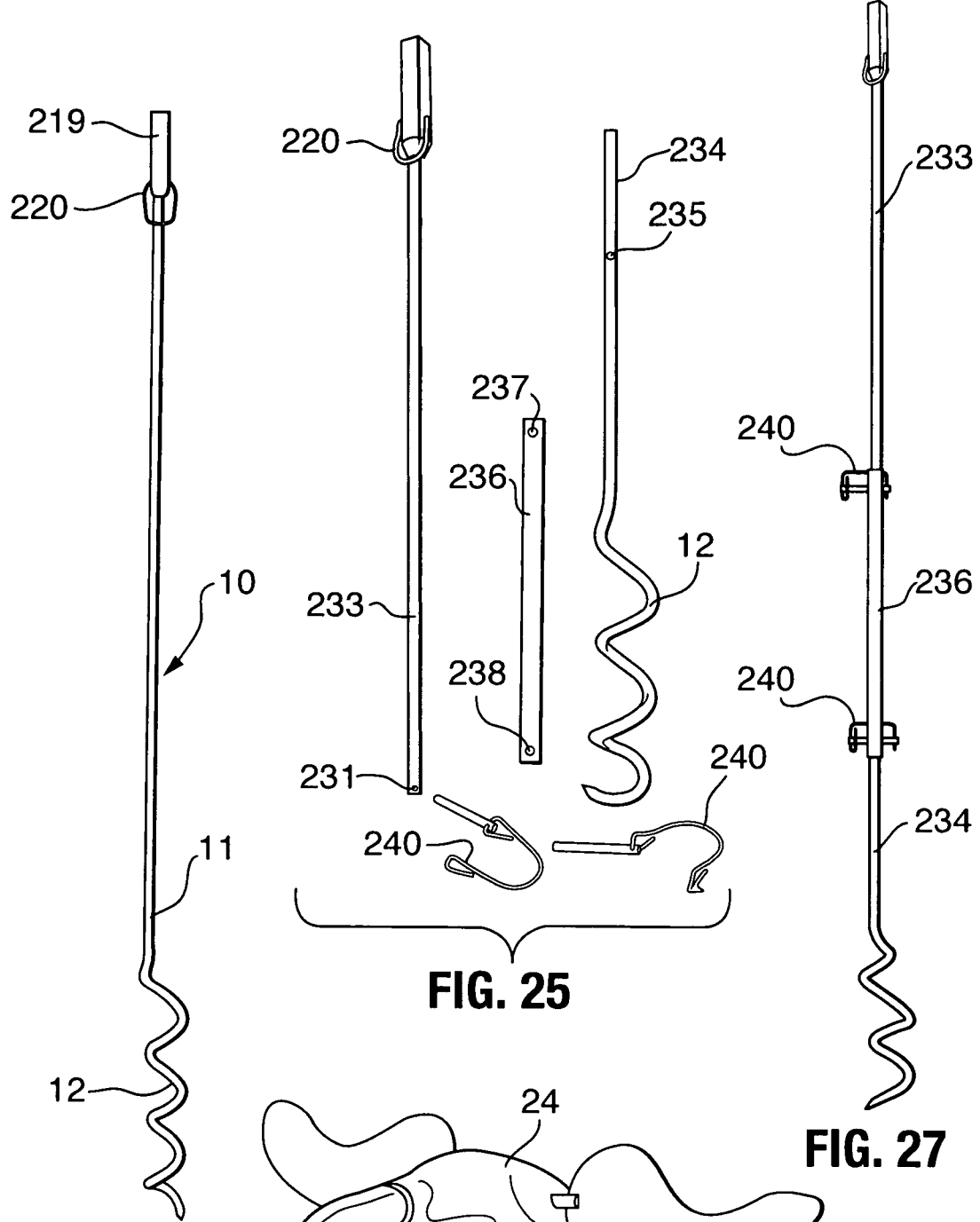
FIG. 24
FIG. 25
FIG. 27
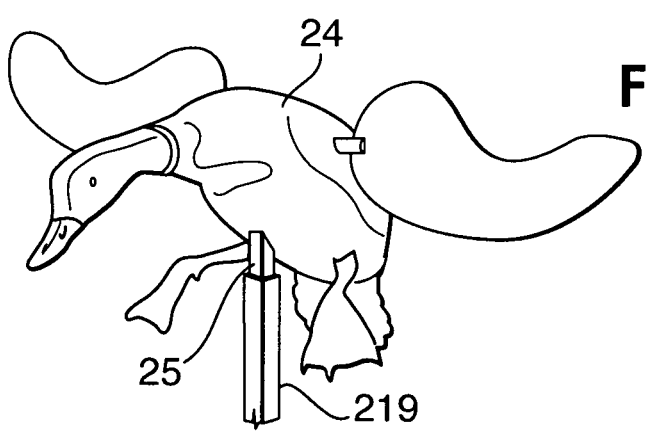
FIG. 26

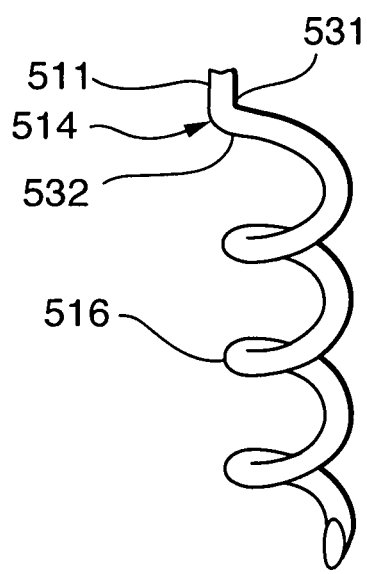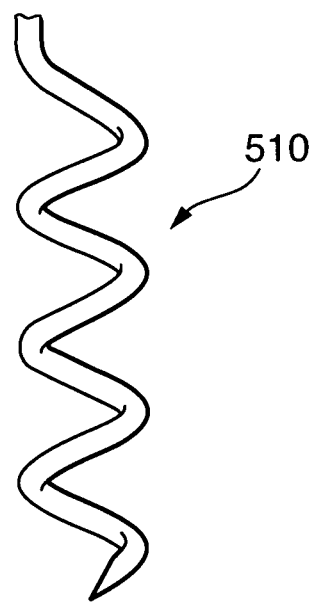
FIG. 35    FIG. 36
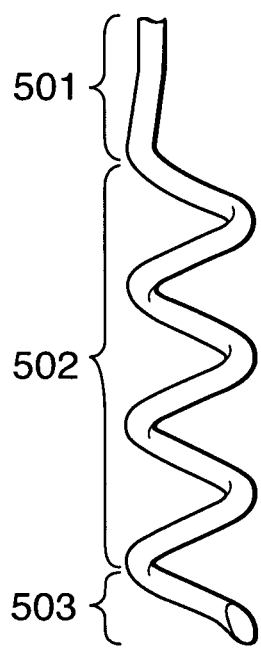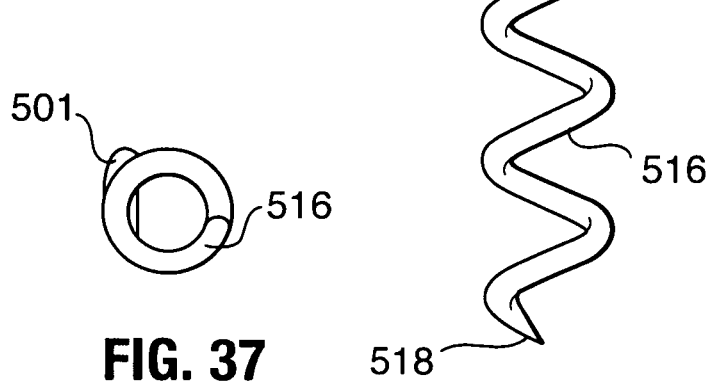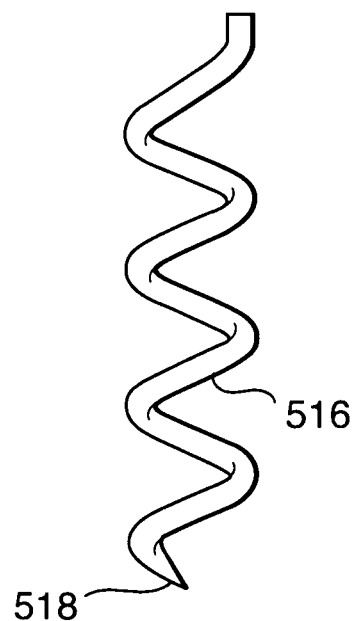
FIG. 38    FIG. 37    FIG. 39

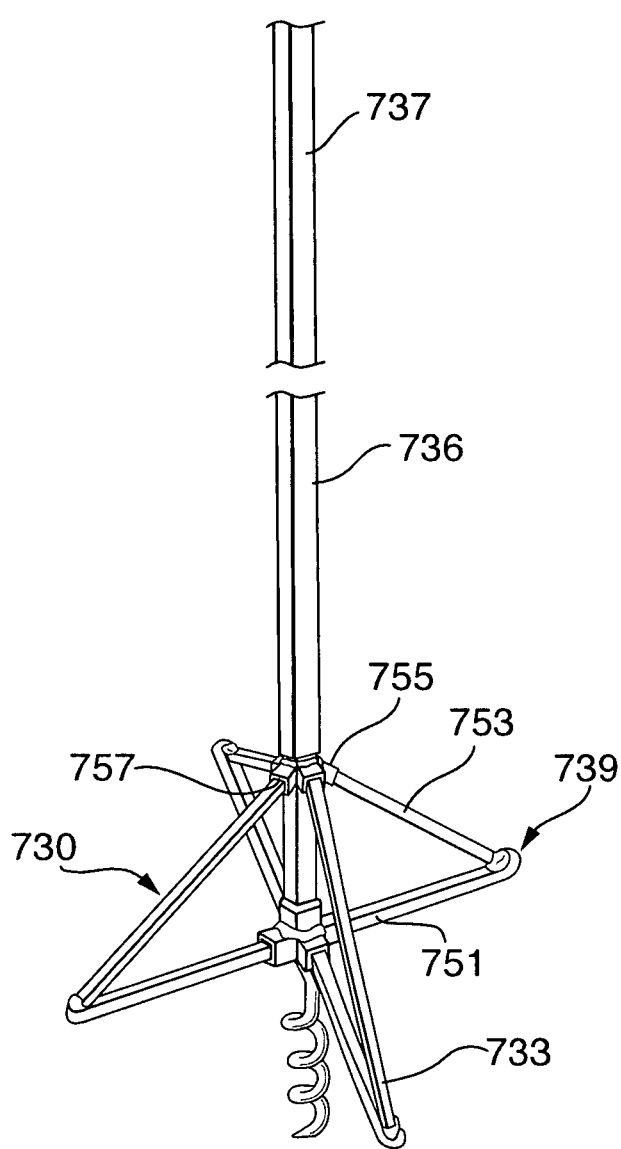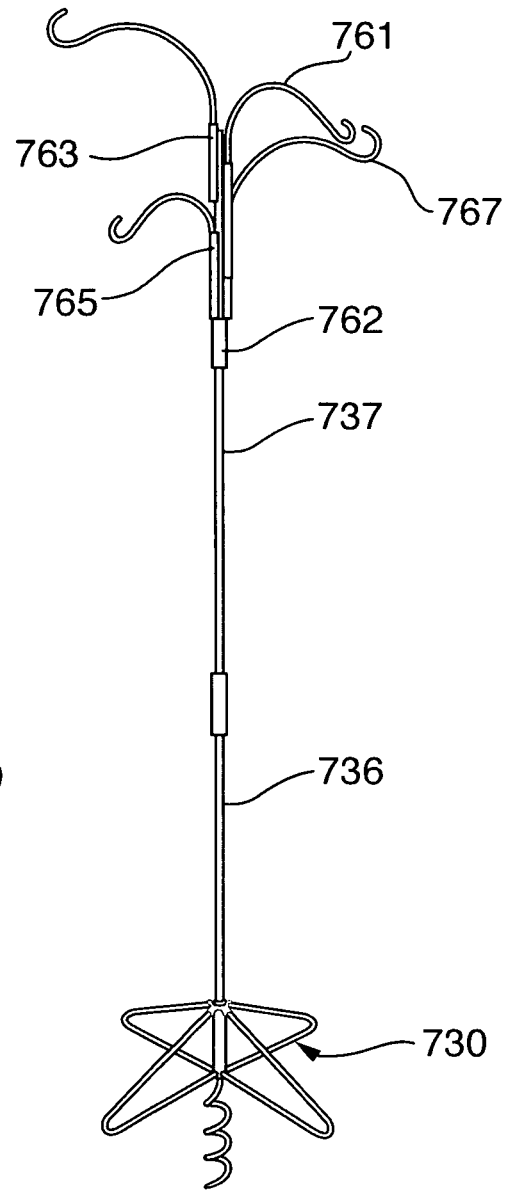
FIG. 45
FIG. 46

AUGER SUPPORT STAND

CROSS-REFERENCES TO RELATED APPLICATIONS

This application is Continuation-In-Part of and claims priority from U.S. application Ser. No. 15/376,482 filed on Dec. 12, 2016 which is a Continuation-In-Part of and claims priority from U.S. Pat. No. 10,159,243 which issued on Dec. 25, 2018 from U.S. application Ser. No. 15/330,409 filed on Sep. 16, 2016 which is a Continuation-In-Part of and claims priority from U.S. Pat. 9,743,659 which issued on Aug. 29, 2017 from U.S. application Ser. No. 14/999,091 filed on Mar. 29, 2016 all of which are incorporated herein in their entirety.

TECHNICAL FIELD

The present invention relates to the field of support stands for supporting objects above the ground.

BACKGROUND OF THE INVENTION

Duck hunters often use decoys for attracting ducks during a duck hunt. The decoys are typically displayed near or in the water and many are animated, that is, many decoys are provided with movable wings and heads which may or may not be motorized. Often times, decoys are attached to a pole or stake which holds the decoy in a preferred position which is likely to attract ducks. The decoy may be held above the water so that the motion of the wings gives the appearance of a duck landing on the water. Therefore, it is a requirement that the stake which holds the duck be firmly connected to the ground. Some decoy stakes have only one spiked end. Other decoy stakes have two spikes which are shoved into the ground: a stout primary spike and a lighter secondary parallel spike, the two spikes being simultaneously shoved into the ground. The stout spike gives the stake strength and rigidity and the lighter spike prevents the stake from spinning in the ground.

Decoy stakes are available from numerous sporting goods outlets which are similar in form to the stakes described above. However, the applicant is unaware of any decoy stakes available or any patents which include all of the elements and limitations of the herein described invention.

SUMMARY OF THE INVENTION

A rotary auger support stand for holding objects such as decoys above the ground. The auger support stand includes at least one rod of longitudinal support member or shaft. The rotary auger anchor comprises a helical coil for screwing that end of the stake into the ground.

An S-shaped handle provides a crank handle for rotatably screwing the anchor into the ground, or at least two opposing legs extend perpendicular from and between the shaft and auger forming a base. The distal end of opposing legs are bent upward perpendicular from the ground forming handles and/or bent upward and inward at an acute angle toward the elongated vertical member or shaft forming brace handles for rotating the auger into the ground. The transverse legs extending from the elongated support pole provides a base bearing against the ground for increased lateral support. The top distal end of the shaft includes means for supporting an object.

The present invention is for a rotary auger decoy stand comprising or consisting of an elongated vertical rod having a helical spiral coil extending downward therefrom a selected distance for penetration into the ground, and at least one "S" shaped loop extending from a top portion of said rod comprising at least two looped sections spaced apart from and in vertical alignment with one another for receiving a support member extending from a decoy.

A decoy stake for holding one or more in position to attract animals. The stake may comprise one shaft or two shaft portions that are fixed together by a clamping means. The shaft includes a helical coil at the bottom end for fixedly screwing that end of the stake into the ground. The top end of the stake has a central rod including an S-shaped handle providing a crank handle for screwing the shaft into the ground and at least two square receivers extending upward and outward from the central rod below the S-shaped handle for holding additional shafts with decoys mounted thereon. The shafts and shaft portions may have a round or square cross-section.

In accordance with the present invention, the decoy support stand can include multiple decoy attachment or holding means extending from a support shaft or stake comprising, consisting of, or consisting essentially of a lower stake portion having a first elongated rod with a helical coil formed at a bottom end thereof, a first receiver tube with clamping means at the top end thereof and an upper stake portion including a second elongated rod having a decoy fixed at the top end, an S-shaped crank handle formed therein within about five inches of a top end thereof. The second elongated rod has at least two decoy receiver tubes including clamping screws and extending outwards from below the S-shaped crank handle. The receiver tubes are canted upwards at an angle of fifteen to thirty degrees. Each of the at least two decoy receiver tubes removably and fixedly hold a rod/decoy combination comprising an elongated decoy rod with a decoy fixedly mounted at a first end and a second end being free. The free end of the second elongated rod of the upper stake portion is inserted into and removably and fixedly held by the first receiver tube of the lower stake portion with clamping means at the top end of the lower stake portion. The first elongated rod and the second elongated rod are one to four feet long.

When compared to a stake with one or two straight spikes, a helical coil is a superior form of attachment to the ground for a decoy stake. A stake screwed into soil provides a more stable anchor than a straight shaft of the same length engaging the ground. Moreover, the hunting area may be swampy or in a shallow lake or pond where the ground is muddy and soft. Sticking a spike into mud is not as secure as a connection made by screwing in a helical coil, even in the mud.

A preferred embodiment of the helical auger. A helix is a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

The present invention comprises a helical auger formed of square or cylindrical bar stock including an inner bend diameter of a selected size such as ¼ inch bar stock, 3/16 inch bar stock, ½ inch bar stock, ⅝ inch bar stock, and ⅜ inch bar stock; a helical pitch of 2.0 for 3.5 revolutions; a variable pitch of 3.0 for 0.25 revolutions; and a pitch diameter of 1.375 inches having a helical pitch of 2.0.

Thus in order to obtain a specif 30 degree angle at the bottom of the screw, the helical pitch as to vary from a constant 2 inches per revolution to 3 inches per revolution from section 2 to section 3. Thus the auger has a helical pitch of 2.0 at section 1 for 3.5 revolutions; a helical pitch at section 2 of 2.0 which changes to a variable pitch of 3.0 at section 3 for 0.25 revolutions. The pitch diameter is 1.375 inches.

It is an object of this invention to provide a portable and reusable decoy holder stand which includes a helical coil at one end which can be screwed into the ground.

It is an object of this invention to provide a decoy support stand which includes an integral crank handle for the purpose of screwing the stand into the ground.

It is an object of this invention to provide an integral crank handle for the purpose of screwing the stand into the ground wherein the crank handle services to support the arm of a decoy substantially vertically with respect to the ground.

It is another object of the present invention to provide a decoy holder wherein the integral handle serves to support the decoy in a rested position.

It is another object of the present invention to provide an integral handle decoy rest at an upper end of a shaft extending upwardly from the spiral auger wherein the handle decoy rest can be bent at a selected angle to hold the decoy in a selected position with respect to the surface of the ground.

It is an object of this invention to provide a multiple decoy stake with a helical coil at one end and a crank handle which can be used to thread the coil into the ground, thus forming a rigid connection with the ground and providing secure support for a decoy.

It is an object of this invention to provide a multiple decoy stake with a helical coil at the bottom end and a crank handle at the top end and also including at least two receiver tubes extending upwards and outwards from the shaft for holding rods which have additional decoys attached.

It is an object of this invention to provide a multiple decoy stake with a helical coil at the bottom end and a crank handle at the top end, the stake having two portions which are assembled to one another and held together by a clamp means. The clamp means is either a clamping screw or an eccentric lobe operated by a lever.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 16 is a perspective view of a rotary auger helix having a straight top portion and a main body portion comprising a helix formed of stock having a square cross-section having a distal point cut creating a wedge shaped tip;

FIG. 17 is a front view of the rotary auger of FIG. 16 showing the angle of the twists forming the flights of the helix stock surface and the angle of the wedge shaped tip;

FIG. 18 is a bottom end view of the rotary auger of FIG. 16;

FIG. 19 is a side view of the rotary auger support of FIG. 16 having a rectangular, or square cross section showing the straight top portion defining a tubular adapter extending from the top for cooperative engagement with a corresponding tube or bar stock shaft of an article to be supported thereon FIG. 20 is a rear view of a rotary auger support of FIG. 16 having a rectangular, or square cross section showing the straight top portion defining a tubular adapter extending from the top for cooperative engagement with a corresponding tube or bar stock shaft of an article to be supported thereon;

FIG. 24 shows a socket or sleeve holding means including a D-ring;

FIG. 25 shows the support stand comprising three sections;

FIG. 26 shows a decoy supported by an arm in cooperative sliding engagement with a sleeve mounted onto the top distal end of the rod;

FIG. 27 shows the assembled support stand sections of FIG. 25;

FIG. 35 is a perspective view of a rotary auger helix having a straight top portion and a main body portion comprising a helix formed of stock having a cylindrical cross-section having a distal point cut at an angle forming a wedge shaped tip;

FIG. 36 is a front view of the rotary auger of FIG. 35 showing the angle of the twists forming the flights of the helix stock surface and the angle of the tip;

FIG. 37 is a bottom end view of the rotary auger of FIG. 35;

FIG. 38 is a side view of the rotary auger support of FIG. 35 showing the top, main body, and bottom portions;

FIG. 39 is a rear view of a rotary auger support of FIG. 35;

FIG. 45 shows a support stand showing cooperatively engageable vertical support stand member sections;

FIG. 46 is an enlarged view of the rotary auger base shown in FIG. 45;

DESCRIPTION OF THE PREFERRED EMBODIMENTS

As used herein, the term "about" can be reasonably appreciated by a person skilled in the art to denote somewhat above or somewhat below the stated numerical value, to within a range of ±10%.

In accordance with the present invention, there is provided a decoy stake which holds a duck decoy in position for attracting ducks during a duck hunt.

The rotary auger decoy stand has a medial portion comprising an elongated rod and a bottom portion comprising a helical spiral coil having a point extending downward from the elongated rod for a selected distance for penetration into the ground. The top portion defines a decoy arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

Figures 1, 2, 3:
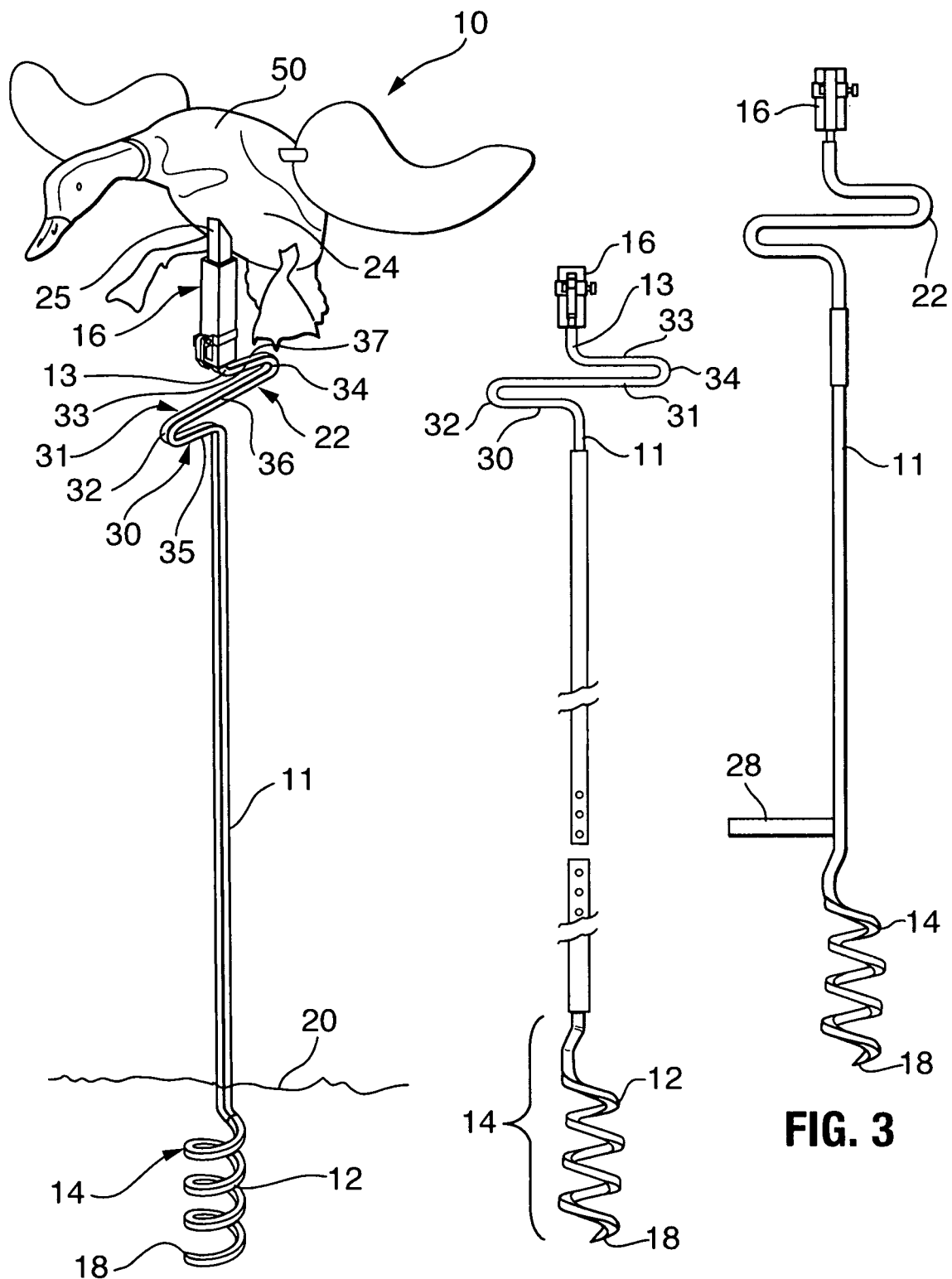
FIG. 1 is a perspective view of the decoy mounting support stand having an integrally formed handle, shaft and auger section.
FIG. 2 is a front view of decoy mounting stand embodiment showing cooperatively engaging elongated member sections forming a vertical shaft.
FIG. 3 is a front view of the decoy mounting stand of FIG. 2 including a foot rest cross bar extending from one side of the elongated support member.
Figure 4:
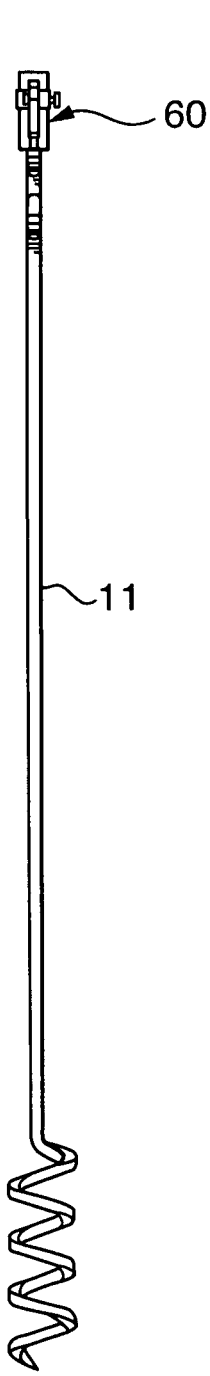
FIG. 4 is a front view of the support stand of FIG. 1 wherein a means for holding a decoy affixed to the elongated support member defining a rod or shaft comprising a receiver having an eccentric lobe actuated by a lever holding the support member arm of a decoy in an upper sleeve portion.
Figure 5:
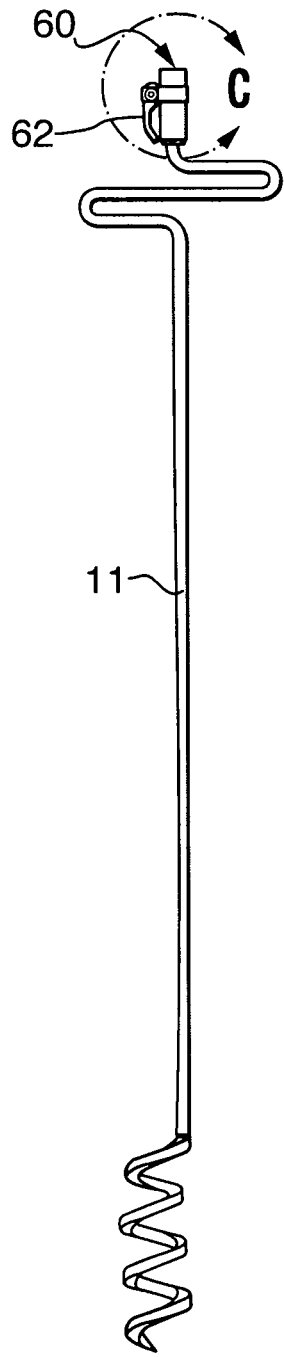
FIG. 5 is a side view of the support stand of FIG. 1 showing the receiver having an eccentric lobe actuated by a lever holds the support member arm of a decoy in an upper sleeve portion affixed to the rod or shaft.
Figure 7:
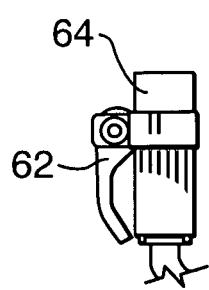
FIG. 7 is a side view showing the receiver cam mechanism providing holding and retaining means for releasably engaging and holding an arm or other support member of a decoy to the support stand.
Figure 6:
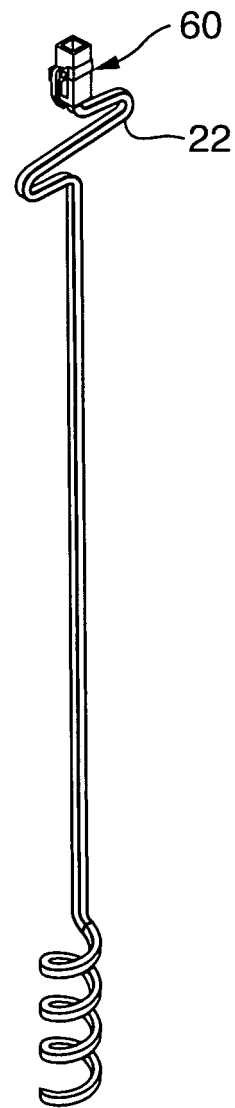
FIG. 6 is a perspective view of the support stand of FIG. 1 showing the receiver having an eccentric lobe actuated by a lever holds the support member arm of a decoy in an upper sleeve portion affixed to the rod or shaft.
Figure 8:
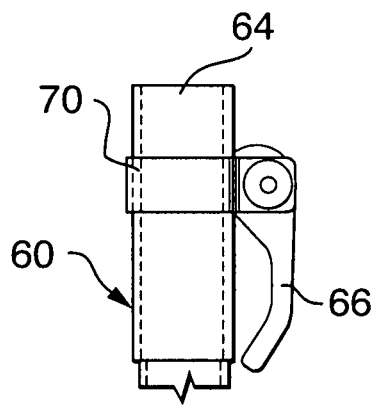
FIG. 8 is shows a side view of the receiver cam mechanism.
Figure 11:
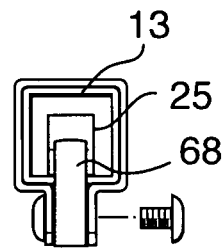
FIG. 11 is shows a top view of the receiver cam mechanism.
Figure 14:
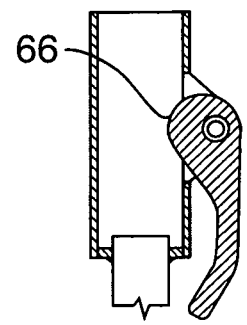
FIG. 14 is shows a sectional view of the receiver of FIG. 12.
Figure 9:
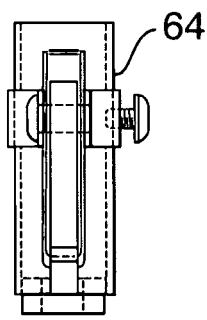
FIG. 9 is shows a front view of the receiver cam mechanism.
Figure 12:
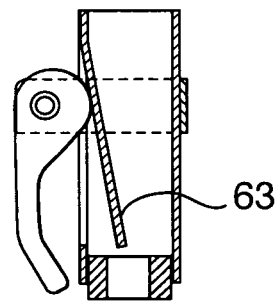
FIG. 12 is shows a sectional view of the receiver cam mechanism showing a cylindrical cam head pivotally held by a pin and peripheral collar extending around the cam body providing a biasing flange member in cooperative engagement with the head of the cam lever securely retaining same against an arm or projection of an object supported thereby.
Figure 15:
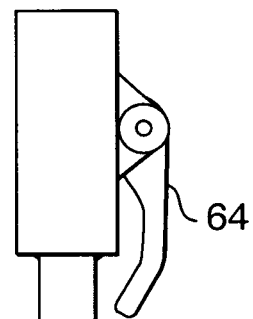
FIG. 15 is a side view of the receiver with the eccentric lobe actuated by a lever mounted on a top distal end of the support stand.
Figure 10:
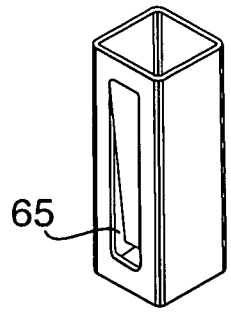
FIG. 10 is shows a perspective view of the receiver cam mechanism.
Figure 13:
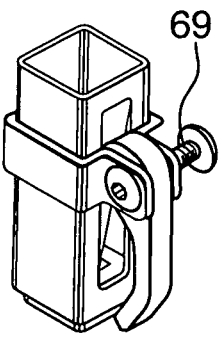
FIG. 13 is a perspective view of the receiver of FIG. 12.

More particularly, the present invention and depicted in FIG. 1, there is provided a rotary auger decoy stand 10 which holds a decoy 24 in position above the ground for the intended user. The integral handle decoy includes a holding means, support or rest 16 located at an upper end of a vertical longitudinal member defining a rod or shaft 11 extending upwardly from a auger 14 comprising a helical coil 12 wherein the decoy 24 includes a support member or arm 25 can be bent at a selected angle to hold the decoy in a selected position with respect to the surface of the ground.

The rotary auger decoy mounting stand 10 provides a portable outdoor rest for removably holding a decoy upright on the ground. The stand includes an above ground upright rod or shaft 11 having a bottom portion for insertion into the ground comprising a helical coil 16 forming an auger 14 having a point 18 at the lower distal end to be fixedly and removably screwed into the ground 20 to support the stand 10 in an upright position. The top end of the rod 11 forming the stand body defines a handle comprising an S-shaped loop configured, sized and shaped and disposed at a selected angle ranging from 0 to 180 degrees from a vertical position to support an arm 30 of a decoy 32 holding the decoy in a substantially vertical position above the ground. The integral loop handle 22 which supports the is decoy serves as means rotating the auger 14 into the ground.

A short segment of the shaft or elongated rod extends above the integral crank handle 22 to support an arm 25 of a decoy 24 substantially vertically with respect to the ground. As shown in the figures, a decoy 24 is removably held in position whereby the weight of the decoy 24 is supported by holding means defining a sleeve 26 extending from the distal end of a handle 22 defining an S-shaped loop. The integral handle 22 extends from a top portion of the support rod 11 from the vertical axis a selected first length 35 and includes a bottom first horizontal portion 30 extending outwardly from the rod 11 at a selected angle at about a right angle of 90 degrees. A middle second horizontal portion 31 extends upwardly over, spaced apart from, and in parallel alignment with the bottom first horizontal portion 30 a selected second length 36 which is twice a long as the selected first length 35. A curved or bent bottom connecting first curved portion 32 connects the outer end of the bottom first horizontal portion 30 with an outer end of the middle second horizontal portion 31 extending past the vertical axis of the shaft 11. An upper horizontal portion 33 extends upwardly over, spaced apart from and in parallel alignment with the middle second horizontal portion 31. A curved or bent bottom connecting second curved portion 34 connects the outer end of the middle second horizontal portion 31 with an outer end of the upper second horizontal portion 33. The upper horizontal portion 33 extends inwardly toward the vertical axis of the shaft 11 a third length 37 which is equal to the first length 35, curving upward forming a top distal end 13 of the rod or shaft 11 in alignment in alignment therewith.

A short lever, cross member, or bar 28 can be affixed to a lower portion of the rod 11 for providing a foot rest to aid in penetrating the surface of the ground and for aiding in rotation of the support stand.

The holding means 16 for removably retaining and tightening a decoy arm 25 in cooperative engagement comprises a sleeve or more preferably a cam mechanism 60. As shown in FIGS. 7-15, the cam mechanism 60 includes a hollow square body 64 affixed to the top distal end 13 of the rod or shaft 13 extending above the handle 22. The cam body 64 includes an opening in a side wall on one side so that a lever 66 having a cylindrical cam head 68 is pivotally held by a pin 69 in alignment with the opening 65 in the cam body 64 by a peripheral collar 70 extending around the cam body 64 providing cooperative engagement with the head of the cam lever when the cam lever is pivoted outwardly normal therefrom biasing the cam lock against a the arm 25 member held therein securely retaining same against the distal end 13 of the shaft 11.

The cam mechanism may also include a strip or flap of metal 65 which extends from the cam body in alignment with the cam head whereby rotation of the cam head biases the flap 65 against the arm 25 of the decoy 24 removing securing same to the distal end 13 of the support stand 10.

As illustrated in FIGS. 16-20, the rotary auger comprises a helical spiral 310 that includes an above ground upright rod or shaft top portion 11 with an auger 14 having an offset neck 314 connecting to a main body portion 302 comprising a plurality of helixes 316. A distal end segment 303 comprises a half helix ending in a sharp point 318. A main body portion helixes 316 is comprised of bar stock having a square cross sectional area. The corners 321 or the square bar stock form cutting edges 323 when the stock is bent or formed into a helix. One preferred embodiment of the instant invention includes a main body portion 302 having three full helixes and a tip portion 303 comprising a half helix. The neck 314 of the helix is angled inwardly toward the center of the main body portion 302 in order to center the shaft top portion 312 with respect to the main body portion 302. The neck portion includes a helix first segment 331, a short straight inward angled second segment 332, a straight angled third segment 333, a short straight outward angled fourth segment 334, connecting to a vertical straight top segment 312 of a desired length.

The helical spiral rotary auger 310 has a bottom portion for insertion into the ground comprising a helical coil 316 having cutting edges with a wedge point 318 at the lower distal end to be fixedly and removably screwed into the ground 20. Formation of the helical auger 310 from a rod of bar stock having a square or rectangular cross-sectional area forms an auger with plane surfaces which can obtain purchase with loose soil or sand like flights yet the tight helical formation provides a tight spiral and small tight cross section enabling the auger to rotate in clay soil, rocky soil, or soil having roots whereby the helical coil 316 can slide around and between obstacles to penetrate the ground.

The cutting edges of the square stock embodiment of the helix enable the auger to cut through soil and debris for ease of rotation and deep ground penetration which includes the desirable features of helix flights. Moreover, the auger of the present invention is an improvement over the flights of conventional augers in that the narrow diameter of the stock and diameter of the flights enables the auger to cut and drill through small openings in rocky soil and wedge between rocks. The square stock helical spiral 310 of the present invention can be rotatably inserted into hard clay which would resist penetration by an auger having planar flights.

A preferred embodiment of the helical auger includes a top vertical portion for mounting an adapter or article to be supported thereon, a neck, a main body portion and a tip portion including a distal end forming a wedge or pointed segment. An inner bend diameter of a selected size such as 1/16 to 1.0 inches, and more preferably is selected from 1/4 inch bar stock, 3/16 inch bar stock, 1/2 inch bar stock, 5/8 inch bar stock, and 3/8 inch bar stock. The rotary auger support includes an effective helical pitch. One preferred embodiment includes a helical pitch of 2 for every 3.5 revolutions and a variable pitch of 3.0 for every 0.25 revolutions. A pitch diameter of 1.375 inches has a helical pitch of 2.0 inches. As best illustrated in FIGS. 16-20, the angle of the twists forming the flights of the helix of the main body portion are angled forming a plane at about 30 degrees shown as angle "A", however, the range could extend from 15 to 45 degrees.

The square bar stock is 3/8 inch in width and the distal end of the tip forming a penetrating or cutting edge is cut at a about a 33 degree angle, Angle "B", forming an angled wedge of 5/8 inch in length forming a tip comprising a cutting wedge point 18 for easy insertion into rocky ground and grounds containing roots. It is contemplated that the angle of the wedge could range from 15 to 45 degrees depending upon the application. The top section 501 is about 4 inches in length, the main body portion 502 comprises four helixes totaling seven inches in length, and the bottom section 503 is about 0.625 inches in length. A round or pointed tip 518 may also be utilized for particular types of substrates such as clay soil.

Figure 21:
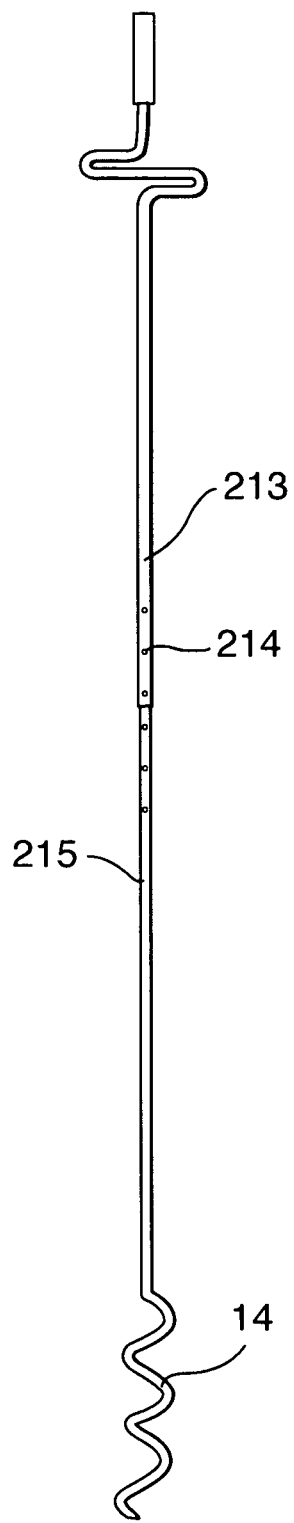
FIGS. 21 shows the support stand comprising of two sections which slidably and cooperatively engages a corresponding sized and shaped second section with a integral loop handle formed at the top of the stand.
Figure 22:
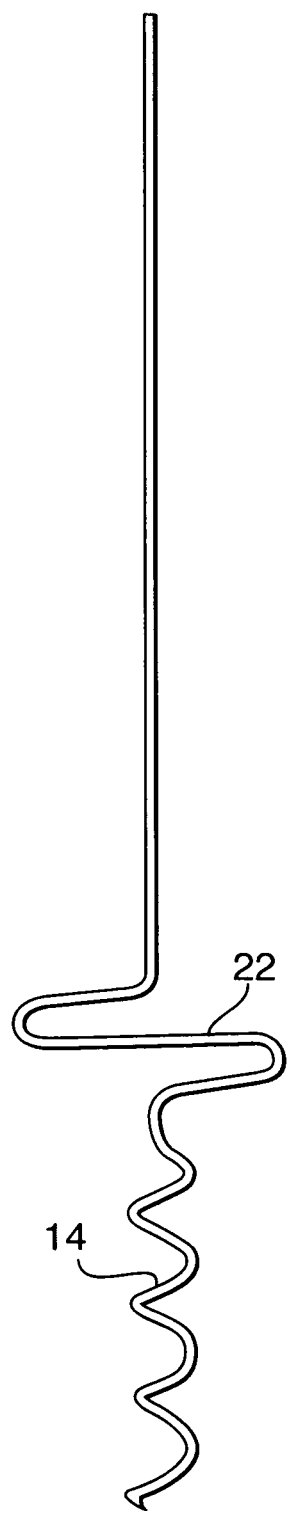
FIGS. 22 shows an integral loop handle disposed at a bottom position of the vertical rod above the auger.
Figure 23:
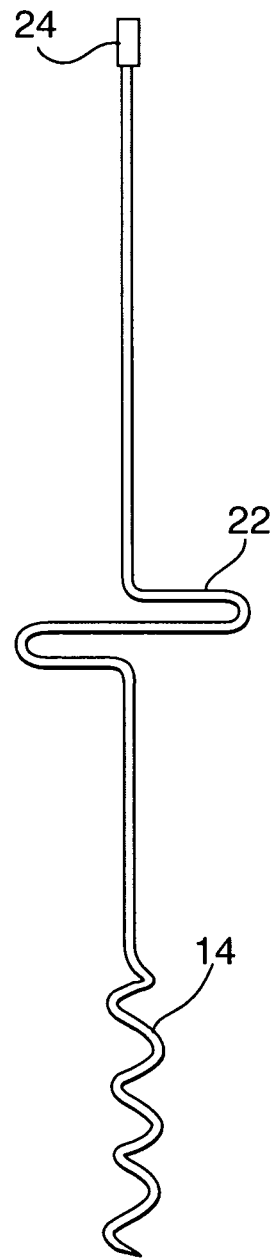
FIGS. 23 shows a handle disposed at a middle position on the rod with respect to the top distal end and auger.

FIGS. 21 shows the support stand 10 wherein the rod 11 comprise of two sections whereby a first section 213 is comprises at least a mid end tubular section which slidably and cooperatively engages a corresponding sized and shaped second section 215. The sections may include a corresponding hole and pin assembly 215 or include distal threaded members for holding the sections together.

FIGS. 22-29 show a looped handle and more particularly an "S-shaped" handle 22 integrally formed from a portion of the elongated vertical support member. In selected embodiments, the handle is disposed at a lower position on the rod 11 with respect to the auger 14 wherein a helical auger of either a cylindrical or a square stock conforms to the descriptions set forth above and shown in FIG. 16-20 or 35-39. The upper portion of the rod 11 can be of any desired length, but is typically 1-6 feet long.

FIG. 24 shows a socket or sleeve holding means 219 including a D-ring 220.

FIG. 25 shows the support stand comprising three sections, a top section 233, middle section 236, and lower section 234, wherein the rod 233 can be connected by cooperatively engaging the sections wherein the center section slides over the lower end of the top section and the upper end of the bottom auger section and is held together by pins 240 inserted through correspondingly aligned holes (231 and 237) and (238 and 235) of the overlapped portions of the sections as shown in FIG. 27.

FIG. 26 shows a decoy 24 supported by an arm 24 in cooperative sliding engagement with a sleeve 219 mounted onto the top distal end of the rod 11.

Figure 28:
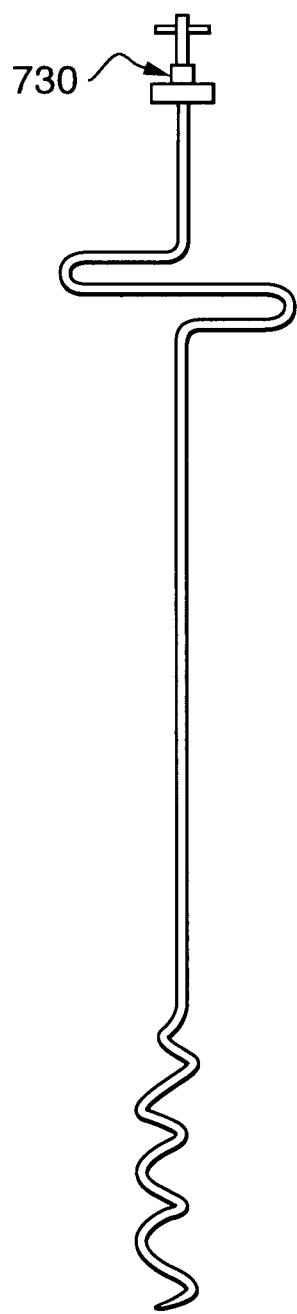
FIG. 28 shows a top distal end adapter or mounting means comprising a square rod with a locking pin.
Figure 30:
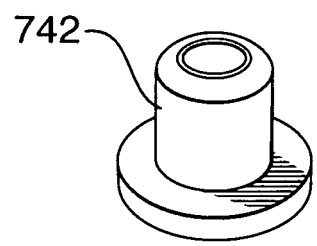
FIG. 30 is an enlarged view of the cap adapter of FIG. 29.
Figure 29:
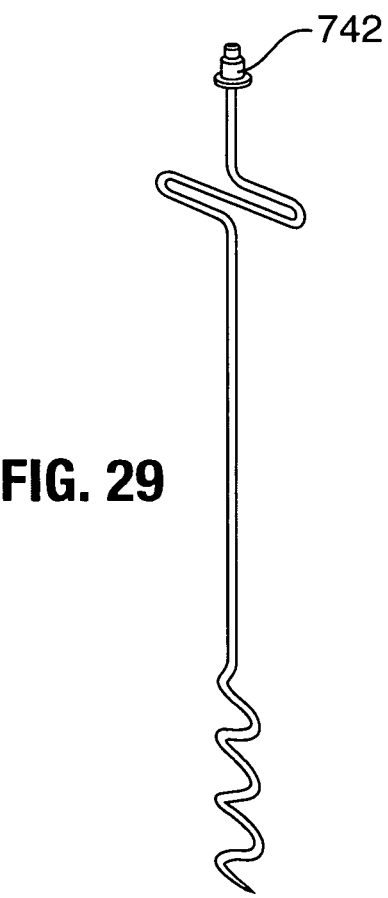
FIG. 29 shows a top distal end adapter comprising a cap.
Figure 31:
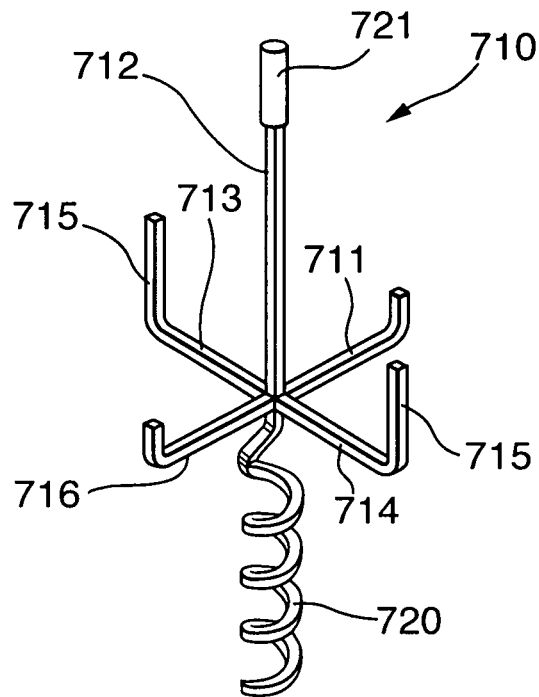
FIG. 31 is a perspective view of the rotary ground auger base and stand showing the spiral auger extending from the lower distal end of the vertical support rod including an adapter depicted as a cylindrical sleeve on the top distal end thereof and a plurality of lateral support legs disposed normal thereto forming a base above the spiral with the legs including upturned distal end arm portions forming handles.
Figure 32:
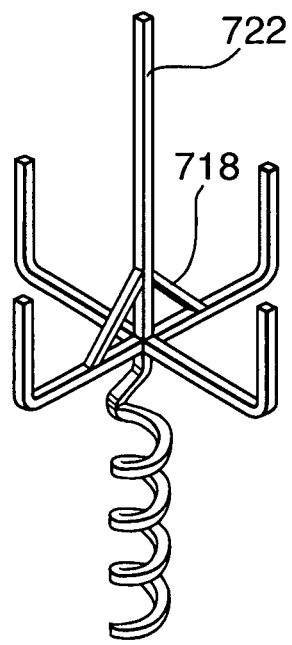
FIG. 32 is a perspective view of the rotary ground auger base and stand showing the spiral auger extending from the lower distal end of the vertical support rod which extends upwardly forming an integral support rod, handle, and mounting or holding means for a decoy extending from a top distal end thereof and a plurality of lateral support legs disposed normal thereto forming a base above the spiral with the legs including upturned distal end arm portions forming handles.
Figure 33:
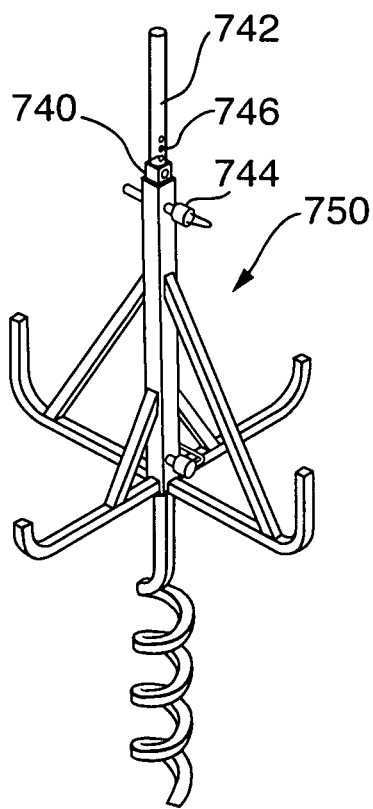
FIG. 33 is a perspective view of a rotary ground auger base and stand including a telescoping shaft having a plurality of coaxial rods disposed therein which can be extended and held in position at a selected height by a pin extending through corresponding holes formed in the shafts at selected locations.
Figure 34:
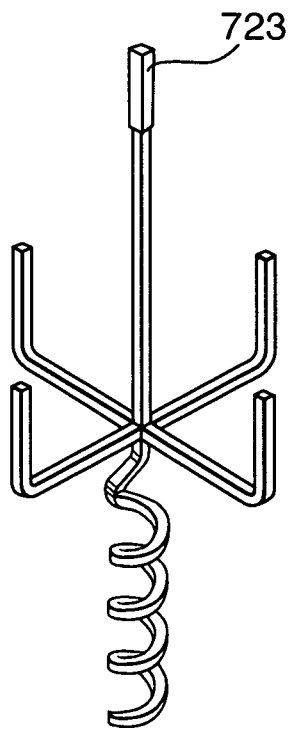
FIG. 34 is a perspective view of the rotary ground auger base and stand showing the spiral auger extending from the lower distal end of the vertical support rod including an adapter defining a sleeve having a square cross sectional area disposed on the top distal end thereof and a plurality of lateral support legs disposed normal thereto forming a base above the spiral with the legs including upturned distal end arm portions forming handles.

FIG. 28 shows a top distal end adapter or mounting means comprising a square rod 32 with a locking pin. FIG. 29 shows a top distal end adapter comprising a cap. FIG. 30 is an enlarged view of the cap adapter of FIG. 29.

As shown in FIG. 31-34, the rotary ground auger base and stand 710 comprises a base having a plurality of transverse legs extending outward perpendicular to the vertical axis with at least two opposing legs including arms 715 extending upward from the distal ends perpendicular thereto in the vertical axis. An elongated shaft 712 with a distal top end 722 having a mounting means or adapter means such as a cylindrical socket 721, a square sleeve 723, a cap 742, a T-bar 730 arrangement with tie loop or D-ring, or an extending shaft portion at the top extends from a vertical rod or shaft extending from the base which sets on the ground. a top distal end including a cap 742 forms a rounded head with a horizontal disc receives different types of decoys and cameras. A spiral auger helical auger of either cylindrical or square stock conforming to the descriptions set forth above and shown in FIG. 16-20 or 35-39 comprise the auger 720 extending from the bottom of the base and includes spaced apart opposing laterally extending legs 711, 713, 714 and 716 for providing additional lateral support by bracing the stand against the ground. Legs 713 and 714 are opposite one another as are legs 711 and 716. Legs 713 and 714 have upward extending arms 715 which are used as hand cranks to screw the helical coil 720 into the ground until the legs are in contact with the ground.

The legs may include support members extending from a selected position at or near the distal end of the transverse legs which are bent and welded or are affixed to the distal ends of the transverse legs extending upward over the transverse legs at a selected acute angle defining braces. or brace handles A web or plate may be used and welded between the vertical elongated support member and the transverse legs as well defining a triangular support or brace 718. It is contemplated that all four of the legs include upwardly extending arms forming handles projecting from the distal ends of each leg; however, at least a pair of opposing legs are provided with arms for rotation of the auger into the ground.

As illustrated in FIGS. 35-39, the rotary auger formed from cylindrical bar stock comprises a helical spiral 510 that includes an above ground upright rod or shaft top portion 511 connecting to an offset neck 514 connecting to a main body portion 502 comprising a plurality of helixes 516. A distal end segment 503 comprises a half helix ending in a sharp point 518. A main body portion helixes 516 is comprised of cylindrical bar stock One preferred embodiment of the instant invention includes a main body portion 502 having three full helixes and a tip portion 503 comprising a half helix. The neck 514 of the helix is angled inwardly toward the center of the main body portion 502 in order to center the shaft top portion 501 with respect to the main body portion 502. The offset neck portion 514 includes a short vertical top segment 531 curving outwardly forming a short segment 532 connecting to the main helix 516.

FIGS. 40-47 show embodiments utilizing cylindrical or square stock material to fabricate rotary auger article supporting stands utilizing the helical auger in combination with a base having at least three transverse legs extending radially from the support above the auger for providing lateral support with the ground.

The spiral auger helical auger of either cylindrical or square stock conforms to the descriptions set forth above and shown in FIG. 16-20 or 37-41 comprise the auger 720 extending from the bottom of the base and includes spaced apart radially spaced apart laterally extending legs 711, 713, 714 and 716 for providing additional lateral support by bracing the stand against the ground. Legs 713 and 714 are opposite one another as are legs 711 and 716. Legs 713 and 714 have upward extending arms 715 which are used as hand cranks to screw the helical coil 720 into the ground until the legs are in contact with the ground. It is contemplated that augers of a larger or smaller length and/or diameter may be utilized as well so long as they utilize a helix having a main body of generally uniform diameter together with means of rotation comprising transverse legs extending radially from the support member positioned directly above the helix providing lateral support and means for rotation.

The legs may include support members extending from a selected position at or near the distal end of the transverse legs which are bent and welded or are affixed to the distal ends of the transverse legs extending upward over the transverse legs at a selected acute angle defining braces. or brace handles A web or plate may be used and welded between the vertical elongated support member and the transverse legs as well defining a triangular support or brace 718. It is contemplated that all four of the legs include upwardly extending arms forming handles projecting from the distal ends of each leg; however, at least a pair of opposing legs are provided with arms for rotation of the auger into the ground.

The rotary auger support stand holds objects such as decoys above the ground. The auger support stand includes at least one rod of longitudinal support member or shaft. The rotary auger anchor comprises a helical coil for screwing that end of the stake into the ground. The auger may be a integral part of the elongated support member or formed from interconnecting cooperatively engaging sections. The support rod may also be formed from cooperatively engaging interconnecting pieces. At least two to six and preferably four spaced apart legs extend perpendicular from and between the shaft and auger forming a base. The distal end of opposing legs are bent upward perpendicular from the ground or bent upward and inwardly at an acute angle toward the shaft forming handles for rotating the auger into the ground. Although not critical, the distal ends of the legs can be affixed to the support shaft by welding of other conventional fastening means such as rivets or bolts. The transverse legs extending from the elongated support pole provides a base bearing against the ground for increased lateral support. The top distal end of the shaft includes means for supporting an object.

Figure 40:
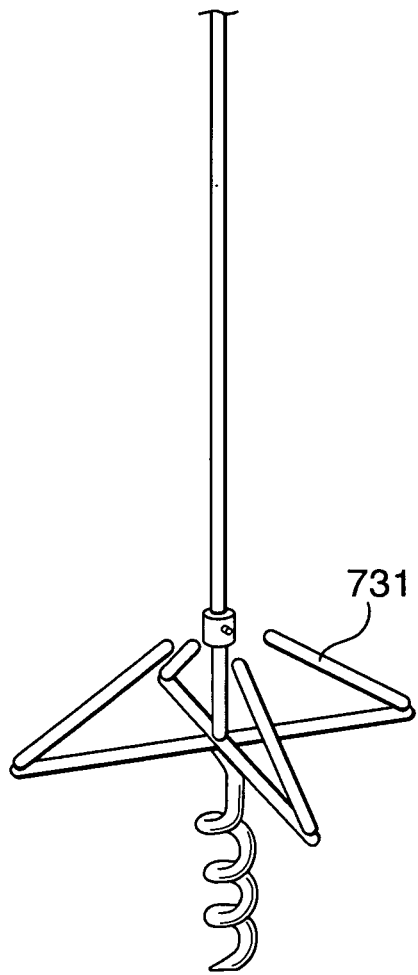
FIG. 40 shows the rotary ground auger base and stand showing the transverse or lateral support legs disposed normal thereto above the spiral including upturned distal end portions bent inwardly or welded at selected acute angles extending inwardly toward the elongated vertical center rod a selected length forming braces which function as handles to rotate the auger into the ground.
Figure 41:
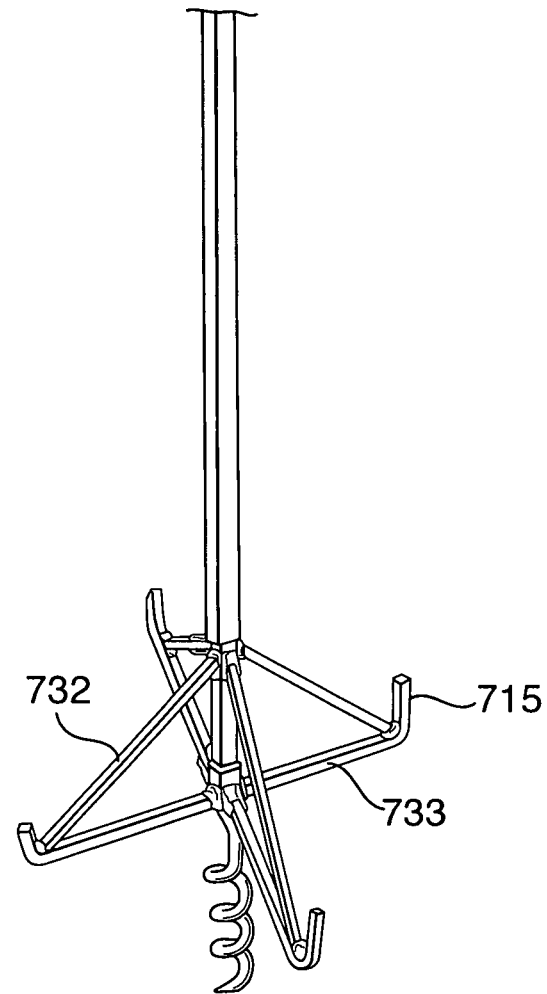
FIG. 41 shows the rotary ground auger base and stand showing a plurality of lateral support legs having support members extending from the lateral legs at a selected acute angle toward the elongated vertical elongated support member.
Figure 42:
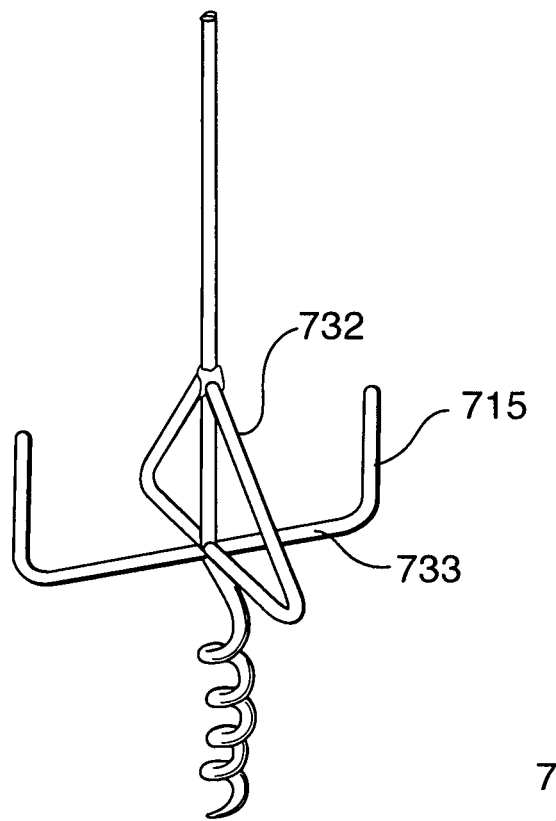
FIG. 42 shows the rotary ground auger base and stand showing the upturned distal end portions forming handles on one pair of opposing legs and a second pair of opposing legs having the distal ends bent inwardly at selected acute angles toward the elongated vertical center rod with the distal ends welded thereto forming braces.
Figure 44:
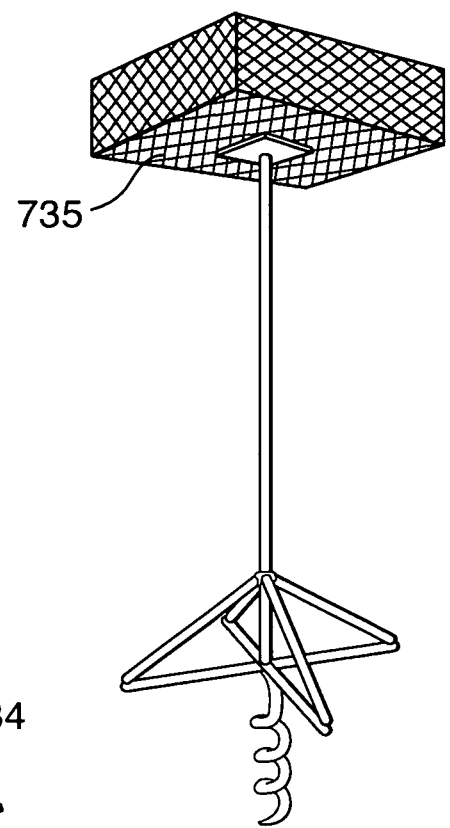
FIG. 44 shows the support stand of FIG. 43 including a feeder box.
Figure 43:
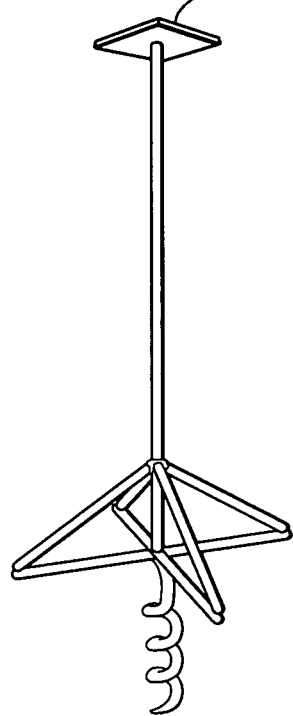
FIG. 43 is a perspective view of the rotary ground auger base, stand, and top distal end support plate showing the upturned distal end portions bent inwardly at selected acute angles toward the elongated vertical center rod and having the distal ends welded thereto forming braces which function as handles to rotate the auger into the ground.

FIG. 40 is a perspective view of the rotary ground auger base and stand showing the spiral auger extending from the lower distal end of the vertical support rod with a plurality of transverse or lateral support legs disposed normal thereto above the spiral including upturned distal end portions bent inwardly or welded at selected acute angles extending inwardly toward the elongated vertical center rod a selected length forming handle 731 which function as handles to rotate the auger into the ground;

FIG. 41 is a perspective view of the rotary ground auger base and stand showing the spiral auger extending from the lower distal end of the vertical support rod with a plurality of lateral support legs disposed normal thereto above the spiral including upturned distal end portions bent upwardly forming brace handles 732 extending from the lateral or transverse legs 733 at a selected acute angle toward the elongated vertical elongated support member and having the distal ends affixed thereto by welding forming braces;

FIG. 42 is a perspective view of the rotary ground auger base and stand showing the spiral auger extending from the lower distal end of the vertical support rod with a plurality of lateral support legs 733 disposed normal thereto above the spiral including upturned distal end portions forming handles 715 on one pair of opposing legs and a second pair of opposing legs having the distal ends bent inwardly at selected acute angles toward the elongated vertical center rod with the distal ends welded thereto forming brace handles 732;

FIG. 43 is a perspective view of the rotary ground auger with a top distal end support plate 734 and a base and elongated support member showing the spiral auger extending from the lower distal end of the vertical support member with a plurality of transverse or lateral support legs disposed normal thereto above the spiral including upturned distal end portions angled inwardly at selected acute angles toward the elongated vertical center rod and affixed thereto by welding forming braces or brace handles which function as handles to rotate the auger into the ground. A feeder box 735 for blocks or seed can be mounted to the support plate 734.

As best illustrated in FIG. 45, the elongated support member is formed from a single elongated member 736 or can include additional cooperatively engaging sections 737. A base 730 is supported by a spiral auger extending from the lower distal end of the vertical support member with a pair of radially extending transverse support legs 733 disposed normal thereto above the spiral for lateral support against the ground and braces or brace handles formed from bending the distal end portions of the transverse legs inwardly at a selected acute angles toward the elongated vertical center rod and affixed thereto by welding or other means of connecting. The base also includes an integral transverse leg and brace member 739 formed from a support member bent at a selected medial position or if formed from two segments welded together to form a leg and brace member 739 having free distal transverse leg end 751 and free distal brace end 753 which are removable and cooperatively engage coupling means such as a socket or sleeve 755 sized and shaped for cooperative engagement with the distal free ends in order that the leg and brace handle can be removed for storage or shipping. Retaining means 757 to lock the legs into position such as a set screw, detent, or pin extending through the coupling and legs may also be utilized with the stand.

Figure 47:
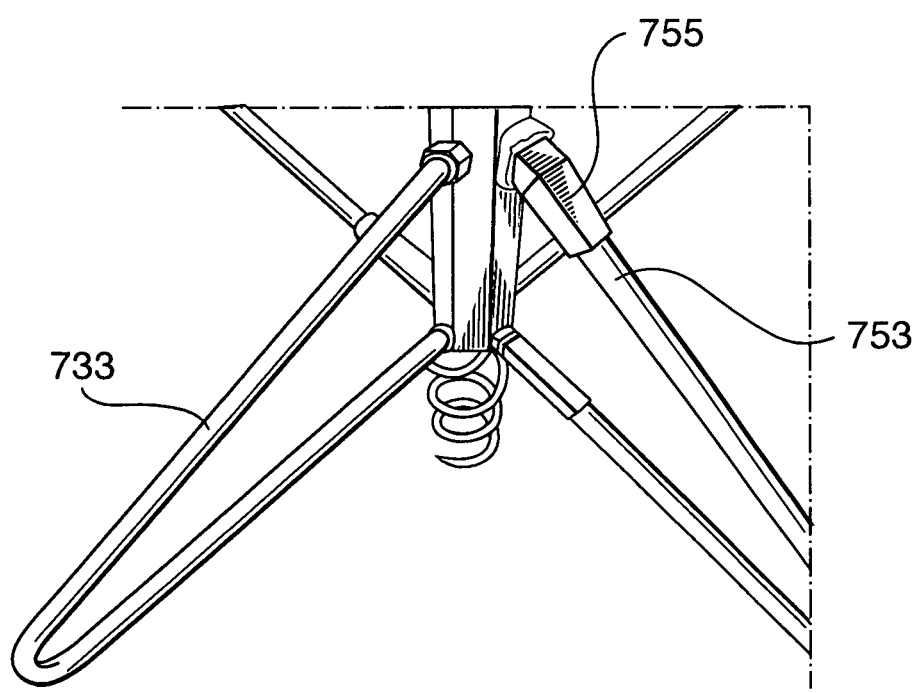
FIG. 47 is shows a multi-hanger support stand having two sections supported by a base including transverse legs having handle braces and a helical auger.

FIG. 46 is an enlarged view of a base including an auger extending from a bottom distal portion and opposing lateral legs bent upward and inward affixed to the vertical elongated support member by welding and including opposing top and bottom sockets forming a pair of spaced apart aligned brackets extending from the elongated support member above the auger for cooperative engagement with the distal ends of a pair of removable opposing integral leg and brace members;

FIG. 47 is shows a multi-hanger support stand having two sections supported by a base wherein a plurality of holding members 763 comprising couplings, sockets or sleeves are affixed in spaced apart alignment with or near a top portion 762 of the vertical elongated support member for cooperatively engaging a plurality of hangers 761 having free proximate ends 765 sized and shaped for cooperative engagement with the holding members 763. Free distal ends 767 including a notch, hook, eyelet or other means for attaching an article therefrom extend from the hangers.

The rotary ground auger base and stand can include a vertical telescoping shaft 740 or telescoping rod 742 extending upward from the base wherein a pin 742 cooperatively engaging through bores or a spring loaded detent (ball and socket) arrangement 744 is utilized to hold the shaft at an extended or collapsed condition.

Figure 48:
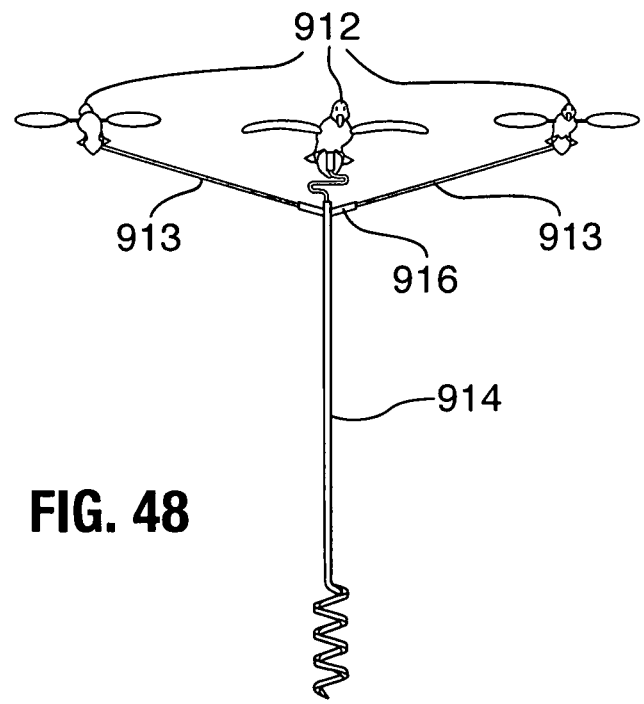
FIG. 48 is a front view of the a multiple decoys fixed on the upper portion of the stake.
Figure 49:
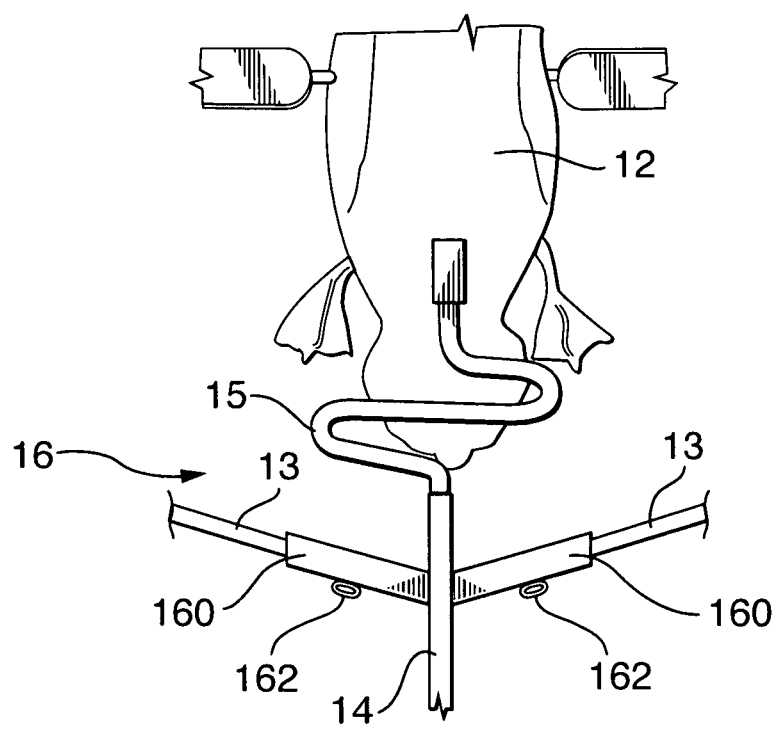
FIG. 49 is a front view of the upper end of the upper portion of the stake particularly showing the square receivers and the S-shaped crank handle.

FIGS. 48 and 49 show a multiple decoy stake includes a two part rod, including and upper portion 914 and a lower portion 920. The free lower end of the upper portion 914 is inserted into a receiver tube 922 at the top end of the lower portion 920 which includes a clamping means to removably and fixedly hold the upper portion 914 within the lower portion 920.

The upper portion of a multiple decoy stake which includes an elongated shaft 914. The lower portion 920 of the shaft terminates at the bottom end in the shape of a helical coil 930. Further, the rod 921 includes a receiver tube 922 at the top distal end, with an adapter tube portion 222 and an eccentric lobe 224 actuated by a lever 228. The helical coil 930 can be welded onto the end of a rod or fabricated by twisting the rod 11 in order to produce an integral one piece auger, rod, and handle assembly. The distal end of the rod 920 typically includes a pointed end 950 for piercing the ground.

Below the handle 915 are two receiver tubes 960 which extend outward and are canted upward by an angle of preferably 15 to 30 degrees. Each receiver tube 960 includes a clamping screw 962 for fixedly but removably holding rods 913. Each of the rods 913 contains another decoy 912. The bottom end of upper shaft portion 914 is inserted into the receiver tube 922 at the top end of the lower shaft portion 920 and is locked into position by moving the clamp lever 928 downwards, thus forcing the eccentric lobe 924 against the upper shaft portion 914.

Multiple decoy replaces the receiver tube with an alternate receiver tube which uses a clamping screw rather than an eccentric lobe to hold the upper shaft portion fixed to the lower shaft portion.

It is anticipated that the shaft portions be made of iron, stainless steel, brass, steel, metal alloy, or any material capable of supporting decoys in windy or turbulent conditions. However, it is also contemplated that portions of the multiple decoy stake may be fabricated from carbon fiber, fiberglass, or even molded from high density plastic in an integral form or in individual sections.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger stand comprising:
   an elongated support member having at least one section;
   an auger comprising a helical spiral coil having a point extending downward from said elongated support member at a selected distance for penetration into the ground;
   handle means for rotating said rotary auger decoy stand formed at a selected position between said elongated support member and said auger comprising at least two opposing legs extending perpendicular from said elongated support member forming a base, each one of said opposing legs having a distal end bent upward from the ground and bent inwardly at an acute angle extending toward said elongated support member forming handles for rotating said auger into the ground with said base bearing against the ground for increased lateral support; and
   a top distal end including a holding means for supporting an object mounted thereon.

2. The rotary auger stand of claim 1, wherein said elongated support member, said top distal end and said bottom section are integrally formed from a single elongated rod.

3. The rotary auger stand of claim 1, wherein said holding means comprises a sleeve disposed on said top distal end sized and shaped for coaxial cooperative engagement with a decoy support member extending from said decoy.

4. The rotary auger stand of claim 1, wherein said holding means comprises a sleeve disposed on a top distal end sized and shaped for coaxial cooperative engagement with a decoy support member extending from said decoy including a retaining means for realizable and immovably securing said decoy in said holding means.

5. The rotary auger stand of claim 4, wherein said retaining means comprises a cam mechanism for realizable tightening said decoy support member within said sleeve.

6. The rotary auger stand of claim 1, wherein said holding means is selected from the group consisting of a cap, a cylindrical sleeve, a square sleeve, a longitudinal extension having a means for mounting an object thereon, a cylindrical lug, a square lug, a threaded lug, a threaded sleeve, a threaded plate, a plate including a lug on a bottom surface, a plate having a sleeve on a bottom surface, a plate having a coupling on the bottom surface, a plate having a through-bore therein, a coupling, a lug of a selected shape for supporting an object thereon, and a sleeve of a selected shape for supporting an object thereon.

7. The rotary auger stand of claim 1, said base including at least four outwardly extending opposing legs extending therefrom normal to said elongated support member and said helical coil providing lateral support to said base.

8. The rotary auger stand of claim 1, wherein at least two of said extending legs in opposing relationship including a distal end angled upwardly at a selected acute angle a selected distance from said base attaching to said elongated support member forming brace handles for rotating said auger into the ground until said opposing legs rest on the ground providing lateral support.

9. The rotary auger stand of claim 1, wherein object is selected from the group consisting of a feeder, a birdhouse, a basket, a plate, and combinations thereof.

10. The rotary auger stand of claim 1, wherein said elongated support member comprises at least two detachable sections joined in cooperative engagement.

11. The rotary auger stand of claim 1, said helical spiral coil further comprising:
   a selected length of bar stock having a square cross sectional area including a bottom portion bent into a helix;
   a neck portion extending downward from said elongated support member;
   a main body portion extending downwardly from said neck portion, said main body portion comprising a helical helix coil extending downward therefrom a selected distance;
   a distal end segment comprising a half helix extending downward from said main body portion; and
   said distal end segment including a point for penetration into the ground.

12. The rotary auger stand of claim 11, wherein said main body portion comprises a helical pitch of 2 for every 3.5 revolutions and a variable pitch of 3.0 for every 0.25 revolutions.

13. The rotary auger stand of claim 11, wherein said main body portion comprises a pitch diameter of 1.375 inches and a helical pitch of 2.0 inches.

14. A rotary auger support stand comprising:
   a) an elongated medial section comprising at least one elongated vertical rod;
   b) handle means for rotating said rotary auger decoy stand formed at a selected position between said elongated medial section and said auger comprising at least two transverse opposing legs extending perpendicular from said elongated medial section forming a base, each one of said transverse opposing legs having a distal end section bent upward from the ground forming handles for rotating said auger into the ground with said base bearing against the ground for increased lateral support;
   c) means for mounting an object extending from a top distal end of said medial section.
   d) a bottom section extending from a bottom distal end of said medial section, said bottom section comprising a helical auger portion comprising:
      I) a selected length of bar stock having a cylindrical cross sectional area including a bottom portion bent into a helix comprising:
      ii) a neck portion extending downward from said elongated medial section;
      iii) a main body portion extending downwardly from said neck portion, said main body portion comprising a helical coil extending downward therefrom a selected distance and having a helical pitch of 2 for every 3.5 revolutions;

iv) a distal end segment comprising a helical coil portion extending downward from said main body portion; and v) said distal end segment including a point for penetration into the ground.

15. The rotary auger support stand of claim 14, wherein said distal end section of said transverse opposing legs are formed angling upwardly and inwardly at an acute angle extending toward said elongated medial section forming handles for rotating said auger into the ground with said base bearing against the ground for increased lateral support.

16. The rotary auger support stand of claim 14, wherein at least two of said transverse opposing legs include a distal end section angling upwardly and inwardly at an acute angle extending toward and affixing to said elongated medial section forming brace handles for rotating said auger into the ground with said base bearing against the ground for increased lateral support.

17. The rotary auger support stand of claim 14, wherein said means for mounting is selected from the group consisting of a cap, a cylindrical sleeve, a square sleeve, a longitudinal extension having a means for mounting an object thereon, a cylindrical lug, a square lug, a threaded lug, a threaded sleeve, a threaded plate, a plate including a lug on a bottom surface, a plate having a sleeve on a bottom surface, a plate having a coupling on the bottom surface, a plate having a throughbore therein, a coupling, a lug of a selected shape for supporting an object thereon, and a sleeve of a selected shape for supporting an object thereon.

18. The rotary auger support stand of claim 14, wherein said elongated support member, said top distal end, said elongated medial section, and said bottom section are integrally formed from a single elongated rod.

19. The rotary auger support stand of claim 14, wherein said medial section comprises at least two detachable sections joined in cooperative engagement.

20. The rotary auger support stand of claim 14, wherein said means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

* * * * *